(12) United States Patent  (10) Patent No.: US 9,120,415 B1
Harris  (45) Date of Patent: Sep. 1, 2015

(54) CARGO PARTITIONING SYSTEM

(71) Applicant: Dale Harris, Pompano Beach, CA (US)

(72) Inventor: Dale Harris, Pompano Beach, CA (US)

( * ) Notice: Subject to any disclaimer, the term of this patent is extended or adjusted under 35 U.S.C. 154(b) by 0 days.

(21) Appl. No.: 14/451,495

(22) Filed: Aug. 5, 2014

(51) Int. Cl.
  *B60P 7/08* (2006.01)
  *B60P 7/15* (2006.01)

(52) U.S. Cl.
  CPC .................................. *B60P 7/15* (2013.01)

(58) Field of Classification Search
  CPC .................................. B60P 7/15; B60P 7/135
  USPC ........................ 410/143, 145, 149, 150, 151
  See application file for complete search history.

(56) References Cited

U.S. PATENT DOCUMENTS

| | | | |
|---|---|---|---|
| 4,834,599 A | 5/1989 | Gordon | |
| 5,265,993 A | 11/1993 | Wayne | |
| 5,472,301 A | 12/1995 | Wallen | |
| D383,056 S | 9/1997 | Murakami | |
| 6,626,624 B1 | 9/2003 | Kopperud | |
| 6,632,055 B2 * | 10/2003 | Kania | 410/38 |
| 7,160,071 B2 | 1/2007 | Legge | |
| 8,016,528 B2 | 9/2011 | Kmita | |
| 8,186,917 B2 | 5/2012 | Nelson | |
| 2007/0207004 A1 | 9/2007 | Silamianos | |

\* cited by examiner

*Primary Examiner* — Stephen Gordon
(74) *Attorney, Agent, or Firm* — Kyle A. Fletcher, Esq.

(57) ABSTRACT

The cargo retention assembly includes a rod operationally coupled to a trailer. A clamp is coupled to an end of the rod. The clamp engages the trailer so the rod is movably coupled to the trailer. The rod is positionable to abut the cargo on the trailer. A fastener is operationally coupled to the clamp. The fastener engages the trailer so the rod is retained at the selected position on the trailer. The rod may be constructed of a plurality of rod members that telescope with respect to one another in order to adjust a rod length thereby accommodating a plurality of varying trailer sizes. The clamp features a bracket with an open top and first side that enables the end of the rod to fall therein.

10 Claims, 4 Drawing Sheets

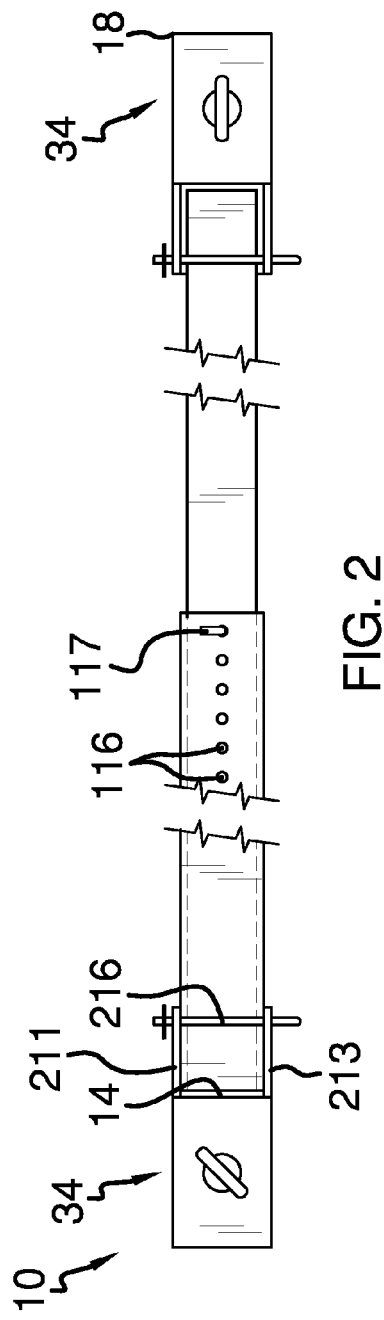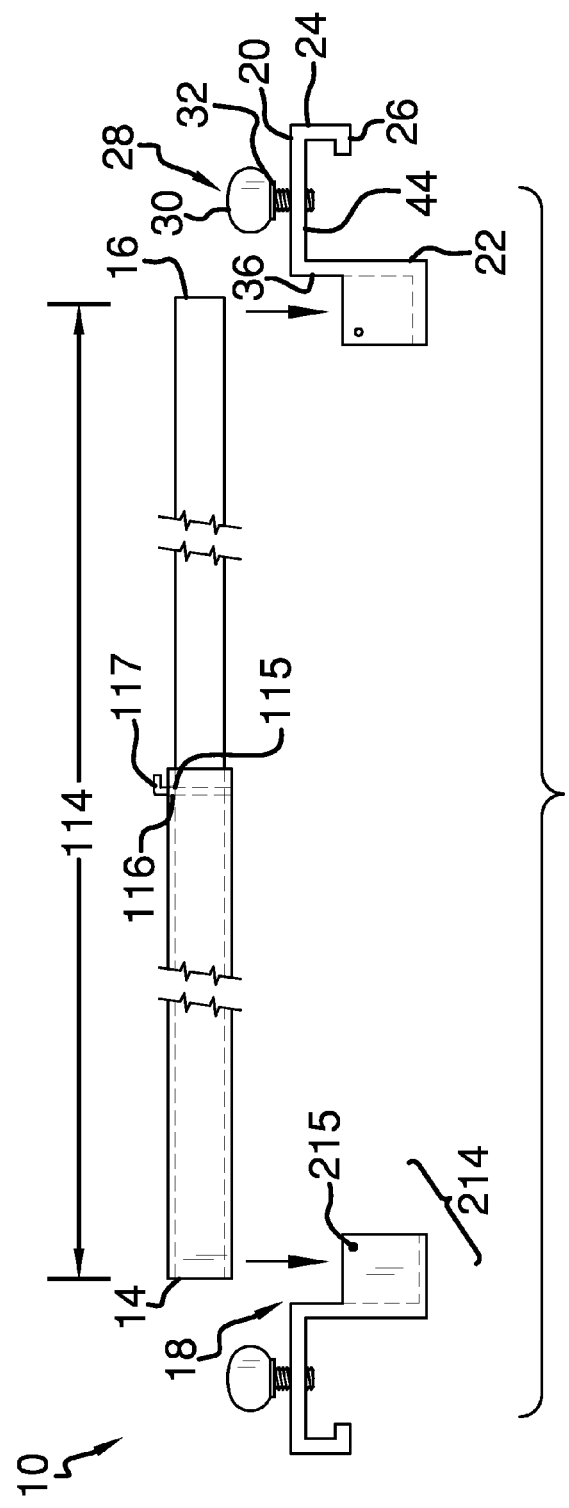

CARGO PARTITIONING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of partitioning systems, more specifically, cargo partitioning systems.

SUMMARY OF THE INVENTION

An embodiment of the disclosure meets the needs presented above by generally comprising a rod operationally coupled to a trailer. A clamp is coupled to an end of the rod. The clamp engages the trailer so the rod is movably coupled to the trailer. The rod is positionable to abut the cargo on the trailer. A fastener is operationally coupled to the clamp. The fastener engages the trailer so the rod is retained at the selected position on the trailer. The rod may be constructed of a plurality of rod members that telescope with respect to one another in order to adjust a rod length thereby accommodating a plurality of varying trailer sizes. The clamp features a bracket with an open top and first side that enables the end of the rod to fall therein. A pin passes across lateral sides of the clamp to prevent the rod from exiting upwardly from the clamp, and thereby securing the rod to the clamp.

An object of the invention is to provide a device that is a cargo partitioning system.

These together with additional objects, features and advantages of the cargo partitioning system will be readily apparent to those of ordinary skill in the art upon reading the following detailed description of presently preferred, but nonetheless illustrative, embodiments of the cargo partitioning system when taken in conjunction with the accompanying drawings.

In this respect, before explaining the current embodiments of the cargo partitioning system in detail, it is to be understood that the cargo partitioning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cargo partitioning system.

It is therefore important that the claims be regarded as including such equivalent construction insofar as they do not depart from the spirit and scope of the cargo partitioning system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a front view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
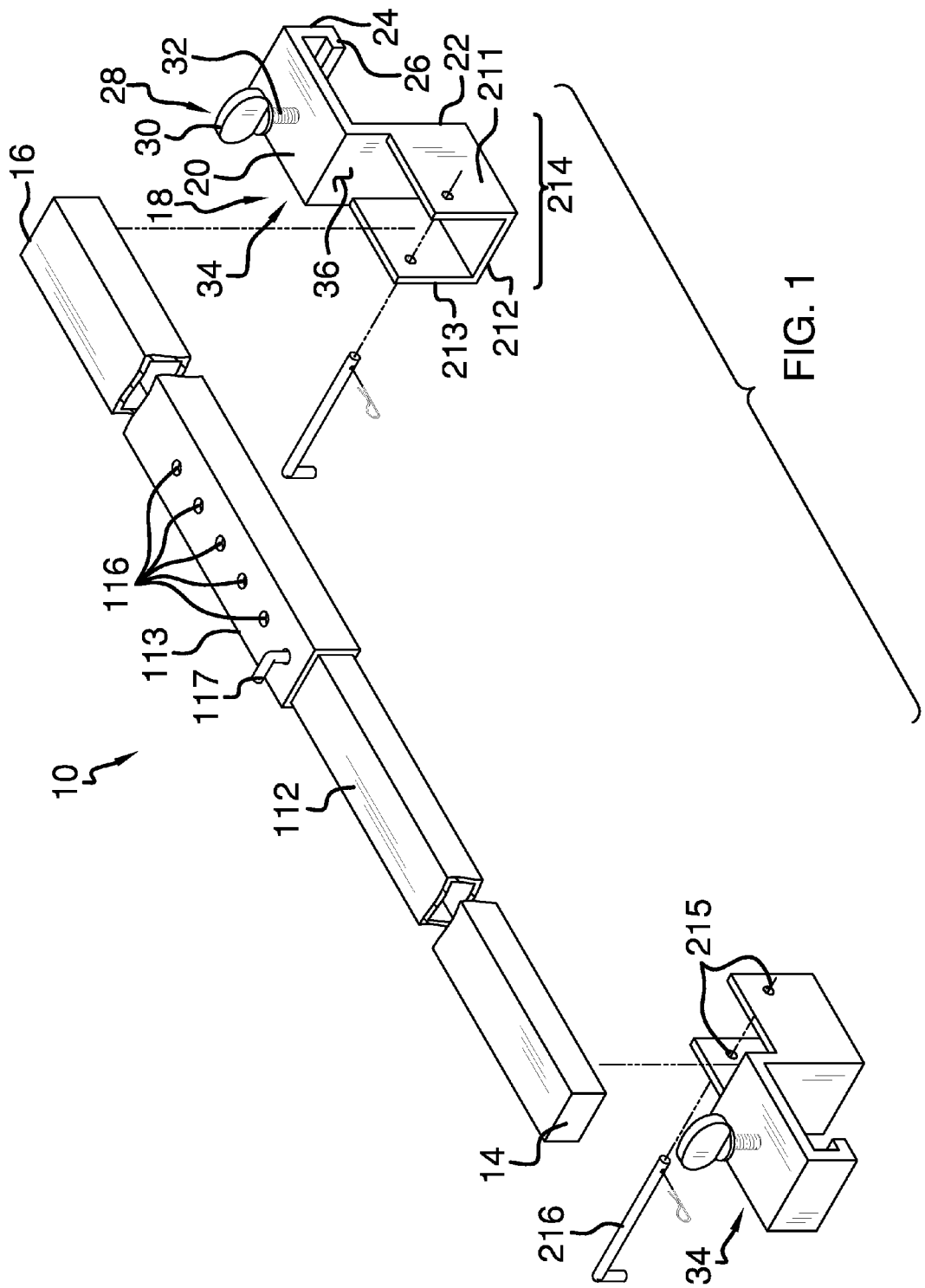
FIG. 1 is a perspective view of a cargo retention assembly according to an embodiment of the disclosure.
Figure 4:
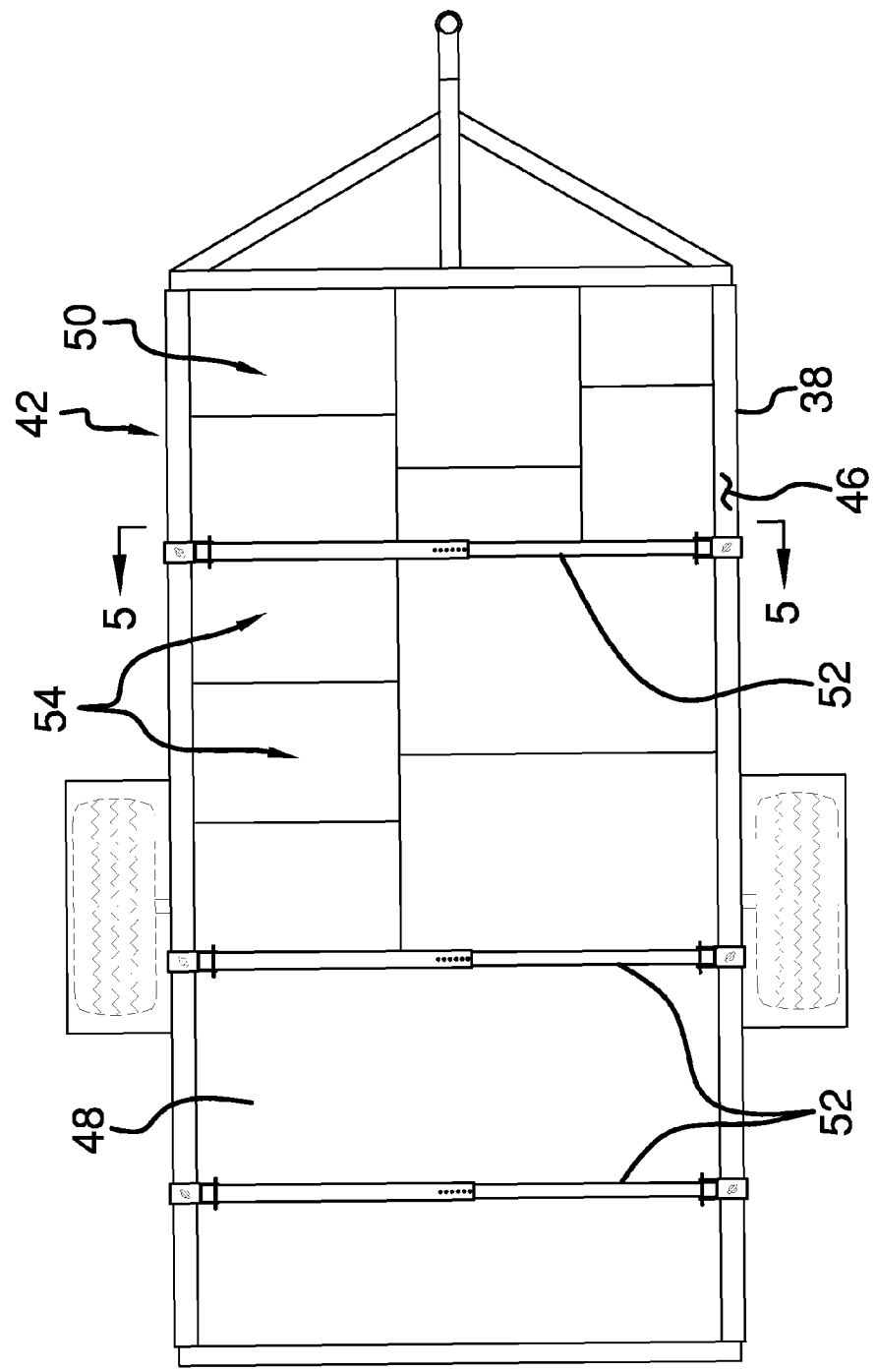
FIG. 4 is an in-use view of an embodiment of the disclosure.
Figure 5:
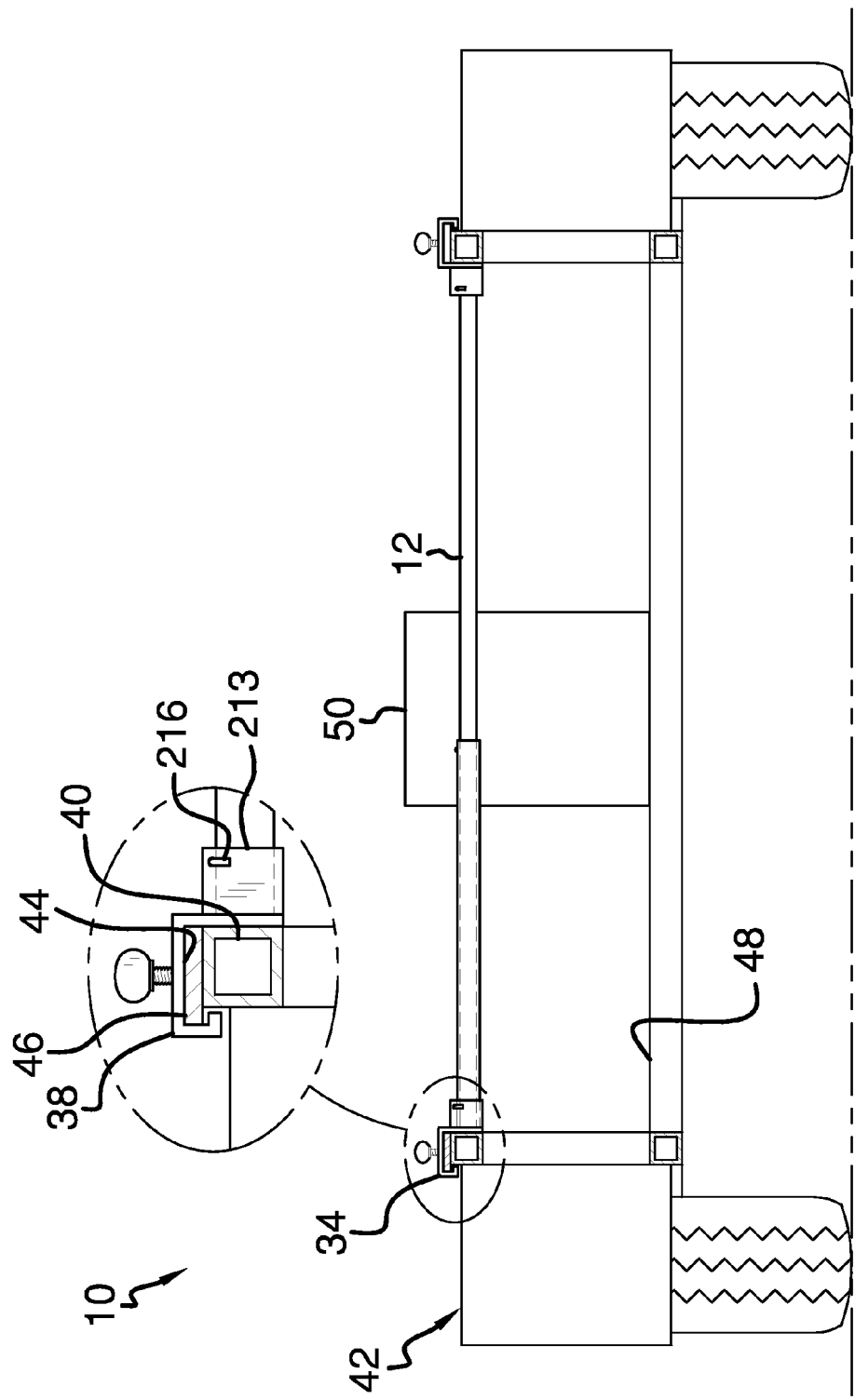
FIG. 5 is a back view of an embodiment of the disclosure.

As best illustrated in FIGS. 1 through 5, the cargo retention assembly 10 generally comprises a rod 12 that has a first end 14 and a second end 16. The rod 12 is elongated between the first end 14 and the second end 16. The rod 12 may be constructed of a first rod member 112 and a second rod member 113. The first rod member 112 is slidably engaged with respect to the second rod member 113 such that a rod length 114 is adjustable. The first rod member 112 includes the first end 14 thereon, and the second rod member 113 includes the second end 16 thereon. The first rod member 112 includes a first pinhole 115 located on an end opposite of the first end 14. The second rod member 113 includes a plurality of second pinholes 116 thereon. A rod pin 117 is used to secure the first pinhole 115 of the first rod member 112 to one of the plurality of second pinholes 116 of the second rod member 113 thereby enabling a selection of the rod length 114.

A clamp 18 is provided. A top portion 20 of the clamp 18 extends laterally away from a coupling portion 22 of the clamp 18. The top portion 20 of the clamp 18 forms a right angle with respect to the coupling portion 22 of the clamp 18. A lateral portion 24 of the clamp 18 extends downwardly from the top portion 20 of the clamp 18. The lateral portion 24 of the clamp 18 is positioned on an opposite edge of the top portion 20 of the clamp 18 with respect to the coupling portion 22 of the clamp 18.

A lip 26 extends inwardly from the lateral portion 24 of the clamp 18. The lip 26 is spaced downwardly from the top portion 20 of the clamp 18. Additionally, the lip 26 extends toward the coupling portion 22 of the clamp 18. A fastener 28 extends downwardly through the top portion 20 of the clamp 18. The fastener 28 may be a thumbscrew of any conventional design. A knob 30 is coupled to a top end 32 of the fastener 28. The knob 30 is gripped by a user.

The clamp 18 is one of a pair of the clamps 34. Each of the pair of clamps 34 slidably engages a top plate 38 on opposite sides of a frame 40 of a trailer 42. A bottom surface 44 of the top portion 20 of the pair of clamps 34 abuts a top surface 46 of each of the top plates 38. The rod 12 is positioned so the rod 12 extends laterally across a bed 48 of the trailer 42. Moreover, the rod 12 is positioned to abut cargo 50 on the trailer 42. The trailer 42 may be an open trailer of any conventional design.

The fastener 28 on each of the pair of clamps 34 engages an associated one of the top plates 38 on opposites sides of the frame 40 of the trailer 42. The rod 12 is retained at the selected position on the trailer 42. Moreover, the rod 12 prevents the cargo 50 from shifting while the trailer 42 is in motion. The assembly 10 may be one of a plurality of assemblies 52. Each of the plurality of assemblies 52 is positionable at a selected point on the trailer 42.

In use, the cargo 50 is loaded on the trailer 42. A selected one of the plurality of assemblies 52 is coupled to the trailer 42. The selected assembly 10 is positioned so the rod 12 abuts the cargo 50. The cargo 50 is dividable into a plurality of groups of cargo 54. Each of the plurality of assemblies 52 are coupled to the trailer 14 and positioned to sequester each of the plurality of groups of cargo 54.

The clamp 18 is further defined with a first clamp side 211, a second clamp side 212, and a third clamp side 213. The first clamp side 211, the second clamp side 212, and the third clamp side 213 form a "U"-shaped bracket 214 that is open from above as well as opposite of an outside surface 36 of the coupling portion 22. The "U"-shaped bracket 214 enables either the first end 14 or the second end 16 to slide down into the "U" shaped bracket 214 without disassembly. Moreover, the first clamp side 211 and the third clamp side 213 each include a clamp pinhole 215 that enables a clamp pin 216 to attach to the clamp 18.

It shall be noted that the rod 12 sits nested inside of the "U"-shaped bracket 214, and the clamp pin 216 secures either the first end 14 or the second end 16 of the rod 12 into the "U"-shaped bracket 214. The clamp pin 216 traverses between the first clamp side 211 and the third clamp side 213 whilst the first end 14 or second end 16 of the rod 12 is seated just below the clamp pin 216.

With respect to the above description, it is to be realized that the optimum dimensional relationship for the various components of the cargo retention assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the cargo retention assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A cargo retention assembly configured to be operationally coupled to a trailer such that said assembly retains cargo at a selected position on the trailer, said assembly comprising:
    a rod adapted to be coupled to said trailer;
    a clamp coupled to an end of said rod, said clamp configured to engage the trailer such that said rod is movably coupled to the trailer, said rod being adapted to abut the cargo on the trailer;
    a fastener operationally coupled to said clamp, said fastener is configured to engage said trailer such that said rod is retained at the selected position on the trailer;
    wherein said rod having a first end and a second end;
    wherein said rod being elongated between said first and second ends;
    wherein the rod is constructed of a first rod member and a second rod member; wherein the first rod member is slidably engaged with respect to the second rod member such that a rod length is adjustable;
    wherein the first rod member includes the first end thereon, and the second rod member includes the second end thereon; wherein the first rod member includes a first pinhole located on an end opposite of the first end;
    wherein the second rod member includes a plurality of second pinholes thereon; wherein a rod pin is used to secure the first pinhole of the first rod member to one of the plurality of second pinholes of the second rod member thereby enabling a selection of the rod length;
    wherein a top portion of the clamp extends laterally away from a coupling portion of the clamp; wherein the top portion of the clamp forms a right angle with respect to the coupling portion of the clamp;
    wherein a lateral portion of the clamp extends downwardly from the top portion of the clamp; wherein the lateral portion of the clamp is positioned on an opposite edge of the top portion of the clamp with respect to the coupling portion of the clamp;
    wherein a lip extends inwardly from the lateral portion of the clamp; wherein the lip is spaced downwardly from the top portion of the clamp; wherein the lip extends toward the coupling portion of the clamp; wherein the fastener extends downwardly through the top portion of the clamp; wherein a knob is coupled to a top end of the fastener.

2. The assembly according to claim 1 wherein the clamp is one of a pair of the clamps; wherein each of the pair of clamps slidably engages a top plate on opposite sides of a frame of said trailer; wherein a bottom surface of the top portion of each of the pair of clamps abuts a top surface of each of the top plates; wherein the rod is positioned so the rod extends laterally across a bed of the trailer; wherein the rod is positioned to abut cargo on the trailer.

3. The assembly according to claim 2 wherein the fastener on each of the pair of clamps engages an associated one of the top plates on opposites sides of the frame of the trailer; wherein the rod is retained at the selected position on the trailer; wherein the rod prevents the cargo from shifting while the trailer is in motion.

4. The assembly according to claim 3 wherein the assembly is one of a plurality of assemblies; wherein each of the plurality of assemblies is positionable at a selected point on the trailer.

5. The assembly according to claim 4 wherein the clamp is further defined with a first clamp side, a second clamp side, and a third clamp side; wherein the first clamp side, the second clamp side, and the third clamp side form a "U"-shaped bracket that is open from above as well as opposite of an outside surface of the coupling portion.

6. The assembly according to claim 5 wherein the "U"-shaped bracket enables either the first end or the second end to slide down into the "U" shaped bracket without disassembly; wherein the first clamp side and the third clamp side each include a clamp pinhole that enables a clamp pin to attach to the clamp.

7. The assembly according to claim 6 wherein the rod sits nested inside of the "U"-shaped bracket, and the clamp pin secures either the first end or the second end of the rod into the "U"-shaped bracket; wherein the clamp pin traverses between the first clamp side and the third clamp side whilst the first end or second end of the rod is seated just below the clamp pin.

8. A cargo retention assembly configured to be operationally coupled to a trailer such that said assembly retains cargo at a selected position on the trailer, said assembly comprising:
a rod adapted to be coupled to said trailer;
a clamp coupled to an end of said rod, said clamp configured to engage the trailer such that said rod is movably coupled to the trailer, said rod being adapted to abut the cargo on the trailer; and
a fastener operationally coupled to said clamp, said fastener is configured to engage said trailer such that said rod is retained at the selected position on the trailer;
wherein said rod having a first end and a second end;
wherein said rod being extending between said first and second ends;
wherein the rod is constructed of a first rod member and a second rod member; wherein the first rod member is slidably engaged with respect to the second rod member such that a rod length is adjustable;
wherein the first rod member includes the first end thereon, and the second rod member includes the second end thereon; wherein the first rod member includes a first pinhole located on an end opposite of the first end;
wherein the second rod member includes a plurality of second pinholes thereon; wherein a rod pin is used to secure the first pinhole of the first rod member to one of the plurality of second pinholes of the second rod member thereby enabling a selection of the rod length;
wherein a top portion of the clamp extends laterally away from a coupling portion of the clamp; wherein the top portion of the clamp forms a right angle with respect to the coupling portion of the clamp; wherein a lateral portion of the clamp extends downwardly from the top portion of the clamp; wherein the lateral portion of the clamp is positioned on an opposite edge of the top portion of the clamp with respect to the coupling portion of the clamp; wherein a lip extends inwardly from the lateral portion of the clamp; wherein the lip is spaced downwardly from the top portion of the clamp; wherein the lip extends toward the coupling portion of the clamp; wherein the fastener extends downwardly through the top portion of the clamp; wherein a knob is coupled to a top end of the fastener.

9. The assembly according to claim 8 wherein the clamp is one of a pair of the clamps; wherein each of the pair of clamps slidably engages a top plate on opposite sides of a frame of said trailer; wherein a bottom surface of the top portion of each of the pair of clamps abuts a top surface of each of the top plates; wherein the rod is positioned so the rod extends laterally across a bed of the trailer; wherein the rod is positioned to abut cargo on the trailer; wherein the fastener on each of the pair of clamps engages an associated one of the top plates on opposites sides of the frame of the trailer; wherein the rod is retained at the selected position on the trailer; wherein the rod prevents the cargo from shifting while the trailer is in motion; wherein the assembly is one of a plurality of assemblies; wherein each of the plurality of assemblies is positionable at a selected point on the trailer.

10. The assembly according to claim 9 wherein the clamp is further defined with a first clamp side, a second clamp side, and a third clamp side; wherein the first clamp side, the second clamp side, and the third clamp side form a "U"-shaped bracket that is open from above as well as opposite of an outside surface of the coupling portion; wherein the "U"-shaped bracket enables either the first end or the second end to slide down into the "U" shaped bracket without disassembly; wherein the first clamp side and the third clamp side each include a clamp pinhole that enables a clamp pin to attach to the clamp; wherein the rod sits nested inside of the "U"-shaped bracket, and the clamp pin secures either the first end or the second end of the rod into the "U"-shaped bracket; wherein the clamp pin traverses between the first clamp side and the third clamp side whilst the first end or second end of the rod is seated just below the clamp pin.

\* \* \* \* \*